United States Patent
Talagery

[11] Patent Number: 6,044,269
[45] Date of Patent: *Mar. 28, 2000

[54] METHOD FOR ENHANCED CONTROL OF MOBILE CALL DELIVERY

[75] Inventor: Gautam G. Talagery, Dallas, Tex.

[73] Assignee: Ericsson Inc., Research Triangle Park, N.C.

[ * ] Notice: This patent is subject to a terminal disclaimer.

[21] Appl. No.: 08/856,333

[22] Filed: May 14, 1997

[51] Int. Cl.⁷ ............................................ H04Q 7/20
[52] U.S. Cl. ........................ 455/433; 455/432; 455/410
[58] Field of Search ...................... 455/432, 433, 455/434, 410, 422, 436, 417, 412, 437, 440, 445

[56] References Cited

U.S. PATENT DOCUMENTS

| | | | |
|---|---|---|---|
| 4,916,728 | 4/1990 | Blair | 455/455 |
| 5,142,654 | 8/1992 | Sonberg et al. | 455/433 |
| 5,159,625 | 10/1992 | Zicker | 455/432 |
| 5,327,575 | 7/1994 | Menich et al. | 455/437 |
| 5,440,614 | 8/1995 | Sonberg et al. | 455/432 |
| 5,479,484 | 12/1995 | Mukerjee et al. | 455/432 |
| 5,497,412 | 3/1996 | Lannel et al. | |
| 5,513,247 | 4/1996 | Mukerjee et al. | 455/403 |
| 5,526,400 | 6/1996 | Nguyen | 455/432 |
| 5,579,376 | 11/1996 | Kennedy, III et al. | 455/411 |
| 5,586,338 | 12/1996 | Lynch et al. | 455/433 |
| 5,765,105 | 6/1998 | Kuriki | 455/410 |
| 5,787,347 | 7/1998 | Yu et al. | 455/440 |
| 5,815,808 | 9/1998 | Valentine | 455/422 |
| 5,815,810 | 9/1998 | Gallant et al. | 455/433 |
| 5,819,180 | 10/1998 | Alperovich et al. | 455/465 |
| 5,854,981 | 12/1998 | Wallstedt et al. | 455/439 |
| 5,884,179 | 3/1999 | Patel | 455/445 |
| 5,913,165 | 6/1999 | Foti | 455/435 |
| 5,915,218 | 6/1999 | Talagery et al. | 455/433 |

FOREIGN PATENT DOCUMENTS 2 304 497   3/1997   United Kingdom .

Primary Examiner—Reinhard J. Eisenzopf
Assistant Examiner—Charles N. Appiah
Attorney, Agent, or Firm—Jenkens & Gilchrist, P.C.

[57] ABSTRACT

A method for providing enhanced control of call connection between a calling station and a called station is disclosed. In response to receipt of a call connection request between a calling station and a called station, a listing of roamer ports associated with the called station is accessed to determine if called station accepts calls from the roamer port of the calling station. Call connection request is granted if the roamer port comprises one of the acceptable roamer ports and is denied if the port is not acceptable.

22 Claims, 3 Drawing Sheets

METHOD FOR ENHANCED CONTROL OF MOBILE CALL DELIVERY

BACKGROUND OF THE INVENTION

1. Technical Field of the Invention

The present invention relates to telecommunications networks, and more particularly, to a method for enabling a subscriber selective control of receipt of calls from various roamer ports.

2. Description of Related Art

In the North American Cellular Network (NACN), a mobile subscriber may roam between service areas of competing vendors. Various techniques have been developed to enable a mobile subscriber to continue being provided with mobile telephone services once they have left their home service area. In a first alternative, once a mobile subscriber travels into a new mobile switching center (MSC) coverage area and turns on their mobile station for the first time, the mobile station attempts to register with the servicing MSC for the area by transmitting an associated identification number known as the international mobile subscriber identity (IMSI) number or Mobile Identification Number (MIN). The serving MSC then communicates with the home location register (HLR) associated with the mobile station using the received IMSI/MIN. This communication is to inform the HLR of the mobile station's new location and to receive requisite subscriber information from the HLR necessary to provide mobile services to the newly registering mobile station.

When a call is made to the roaming subscriber, the calling station dials a cellular number associated with the subscriber, and the call is routed to the gateway MSC (GMSC) corresponding to the dialed cellular number. The GMSC queries the HLR of the called subscriber for the roaming location of the called subscriber. The HLR queries the visited MSC where the called subscriber is currently located and requests a temporary location directory number (TLDN) which is returned to the HLR and the GMSC. The GMSC uses the TLDN to route the call to the called subscriber. The calling station will accrue long distance charges for maintaining a connection to the GMSC of the called subscriber. The roaming called subscriber accrues similar charges when the call is routed back to their roaming location. In a situation where the calling station and the called subscriber may be located in the same area, this creates unnecessary expenses.

In order to combat this problem, the concept of the roamer port was developed. The roamer port is a function designed to minimize the long distance charges that a calling station and called subscriber are liable for when the called subscriber is a long distance from his/her GMSC, but a short distance from the calling station. When utilizing a roamer port, a calling station dials a dedicated roamer port telephone number. This connects the calling station to a roamer port that then sends the calling station a dial tone. Upon hearing the dial tone, the calling station dials the subscriber's normal cellular telephone number. The roamer port seizes a signaling trunk to the home location register of the subscriber only for the period of time needed to retrieve a routing number for the subscriber. The signaling trunk with the home location register is then released, and a call is set up from the calling station to the roamer port to the roaming subscriber. Thus, the subscriber station incurs no long distance charges if the roamer port is local but still may incur long distance charges if the roamer port is a long distance from the called subscriber. The calling station only incurs those charges needed to connect to the roamer port.

While the use of roamer ports have enabled cellular service subscribers to limit the long distance costs involved in utilizing roamer functionalities, there still exist the possibility of incurring long distance costs from roamer port calls via a port that is not closely located. Thus, some manner of enabling a subscriber to control from which roamer ports they receive roamer port calls would greatly benefit the subscriber's ability to utilize cellular services in a cost efficient manner.

SUMMARY OF THE INVENTION

The present invention overcomes the foregoing and other problems with a method for connecting a calling station and a called station through a roamer port such that the called station may selectively designate which roamer ports from which it will accept calls. Initially, a subscriber indicates to a service provider if they desire enhanced mobile call delivery services. The subscriber then designates a list of non-preferred/preferred roamer ports from which they will not/will accept calls. The default condition will designate all roamer ports as preferred ports.

Upon receipt at a mobile switching center (MSC) of the calling station of a call request to a called station having the enhanced mobile call delivery services, the roamer port associated with the MSC of the calling station accesses a listing of roamer ports for the called station. In one embodiment, the accessing procedure involves contacting the home location register (HLR) of the called station and comparing the roamer port of the calling station to the listing of roamer ports at the HLR of the called station to determine whether to connect the call.

In another embodiment, the list of roamer ports of the called station is transmitted to the roamer port of the calling station, and the comparison to determine call connection is made at the roamer port. In both embodiments, the roamer port of the calling station is compared to the listing of roamer ports to determine whether or not the called station accepts calls from the roamer port. If so, the call connection request to the called station is granted. Otherwise, call connection is denied with the called station, and the calling station is notified of the failed connection attempt.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
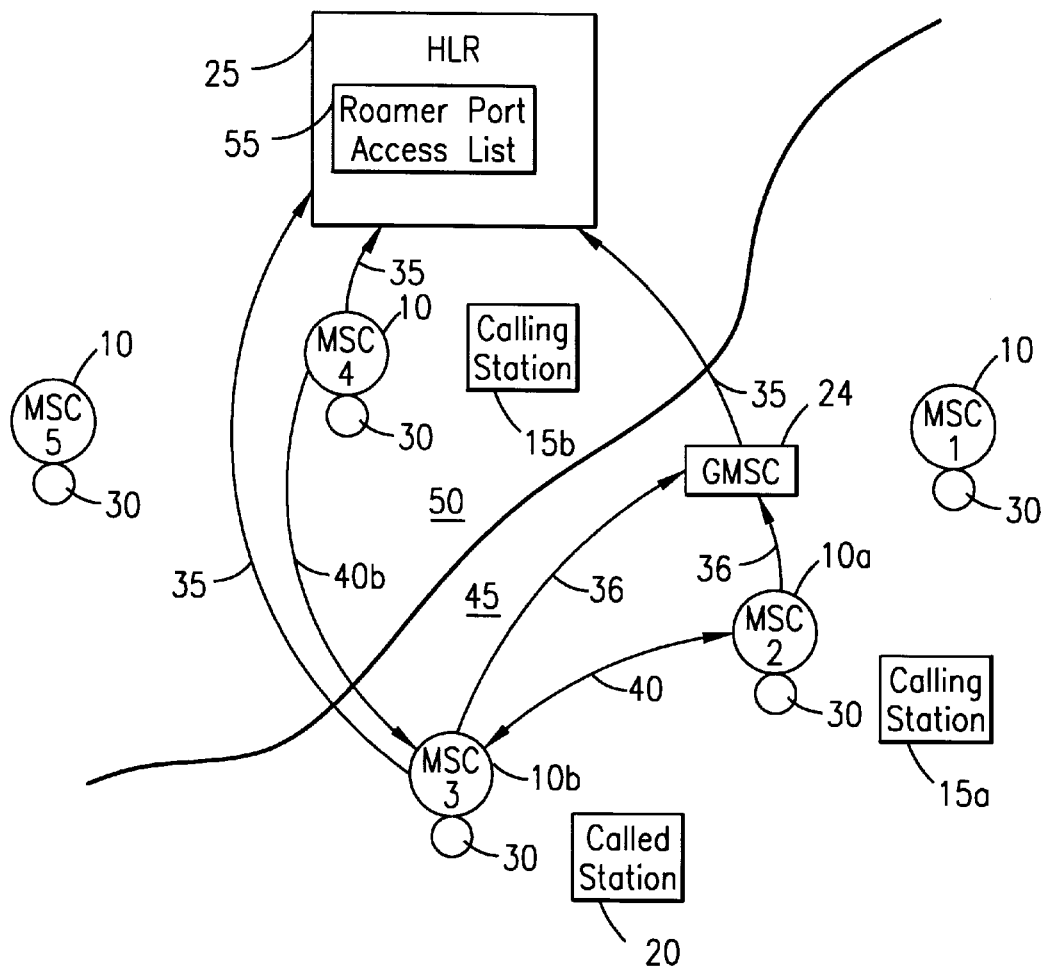
FIG. 1 is an illustration of a plurality of mobile switching centers and a home location register which may be utilized to connect a calling station to a called station using the method of the present invention.

Referring now to the drawings, and more particularly to FIG. 1, there is illustrated a plurality of mobile switching centers (MSC) 10 that a calling station 15 may use to interact with a called station 20 and the associated home location register (HLR) 25 and GMSC 24 of the called station. Each MSC 10 has an associated roamer port 30 through which a calling station 15 may be connected to a called station 20 without forming a permanent communications link 36 from the MSC 10 of the calling station 15 through the GMSC 24 and back to the MSC of the called station 20. The roamer port 30 generates a temporary link 35 with the HLR 25 of the called station 20 to determine the MSC 10 serving the called station. Once this is done, the communications link 35 is dropped, and a link 40 is formed between the MSC 10a of the calling station 15 and the MSC lob of the called station 20.

In the case of a calling station 15a located in a first long distance area 45 also containing the called station 20, the connection to the called station would not incur long distance charges. However, if the calling station 15b was located within a second long distance area 50, the connection 40b between the calling station 15b and called station 20 would require the payment of long distance service charges by the called station 20.

In order to avoid this problem, the called station 20 subscriber specifies with the service provider controlling their HLR 25 that they wish to have enhanced mobile call delivery services. The service provider assigns this feature to the called station 20, and the subscriber provides the service provider with a list of non-preferred roamer ports from which the subscriber does not wish to receive roamer port calls. Alternatively, the subscriber could provide a preferred list of roamer ports from which the subscriber will receive calls.

This information is stored in a roamer port access list 55 as information relating to the called station 20 within its HLR 25. In this manner, called station 20 may designate specific MSCs from which it will accept roamer port calls, for example, MSC 1 and MSC 3; or MSCs from which it will not accept roamer port calls, for example, MSC 4 and MSC 5. In this manner, the called station 20 can control which long distance calls are received by designating which MSC roamer ports 30 will be able to achieve a call connection.

Figure 2:
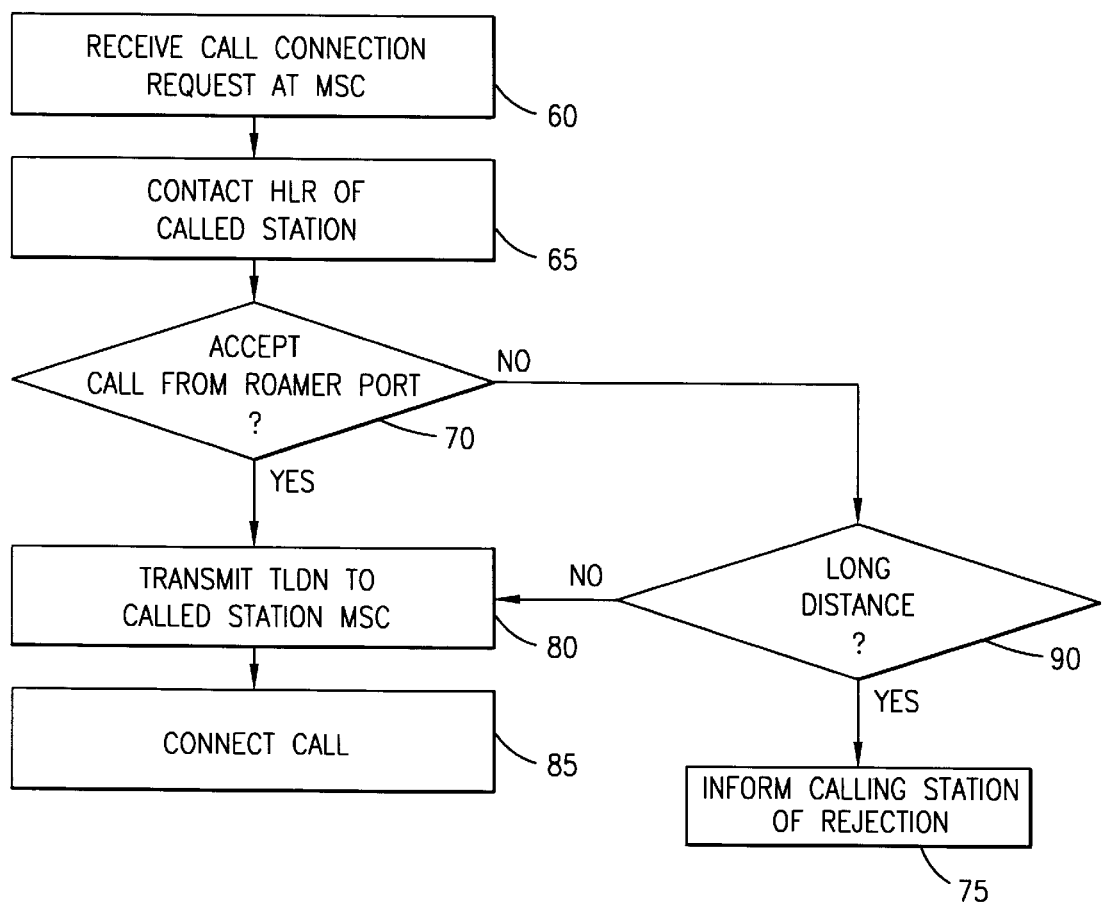
FIG. 2 is a flow diagram illustrating a method for call connection between a calling and called station using a roamer port list at the HLR of the called station.

Referring now to FIG. 2, there is illustrated a first method by which a calling station 15 may attempt a call connection with a called station 20. Initially, at step 60, the mobile switching center 10 of the calling station 15 receives a call connection request to the called station 20. The roamer port 30 at the MSC 10 of the calling station 15 contacts the home location register 25 of the called station 20 at step 65 in an attempt to determine the mobile switching center serving the called station.

The HLR 25 contains the roamer port access list 55 which is accessed and compared to the roamer port 30 of the calling station 15 to determine whether the call has originated from a roamer port from which the called station will accept calls at step 70. If not, the last known location (MSC 3) of the called station is compared at step 90 with the MSC of the calling station (MSC 4) to determine if delivery of the call may result in long distance charges. If not, the TLDN is returned, as in step 80, and the call is connected at step 85. If the call would result in long distance charges, the calling station 15 is informed at step 75 that delivery of the call has been rejected. If the calling station 15 is attempting call connection through an allowed roamer port 30, the TLDN of the called station MSC is transmitted to the roamer port of the calling station at step 80. A call connection between the calling and the called station may then be completed at step 85 through the roamer port 30. Call connection through a non-acceptable roamer port may also be completed if long distance charges would not accrue.

Figure 3:
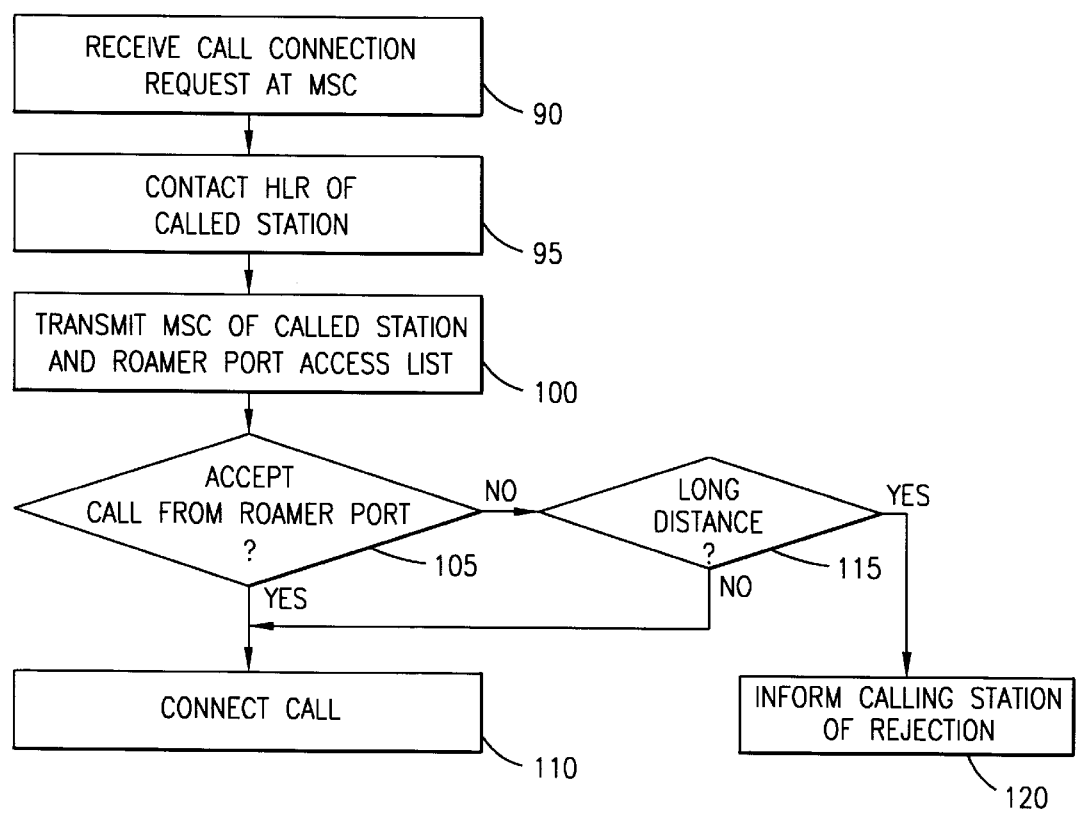
FIG. 3 is a flow diagram illustrating a method for call connection between a calling station and called station using a preferred roamer port list downloaded to the MSC serving the calling station.

Referring now to FIG. 3, there is illustrated an embodiment of a second method for connecting a calling station 15 to a called station 20 having enhanced call connection functionalities. The receipt of a call connection request from a calling station 15 at the MSC 10 of the calling station at step 90 initiates contact with the HLR 25 of the called station 20 at step 95. In response to this contact, the HLR 25 of the called station 20 transmits to the roamer port 30 of the calling station 15, the MSC 10 serving the called station and the roamer port access list 55 at step 100.

At the MSC 10 of the calling station 15, inquiry step 105 determines if the roamer port 30 of the calling station comprises one of the allowed roamer ports as indicated by the roamer port access list 55. If so, call connection is initiated between the calling station 15 and the called station 20 at step 110. If the roamer port 30 of the calling station 15 is not acceptable, a second inquiry at step 115 determines whether connection of the call to the called station 20 would require the called station to incur long distance charges. If no long distance charges would be incurred the call may be delivered at step 110. Otherwise, call connection is not completed at step 120, and the calling station 15 is notified of the failed connection.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method of connecting a call between a calling station and a called station, comprising the steps of:

receiving at a MSC of the calling station a call connection request to the called station;

accessing a listing of roamer ports associated with the called station, the listing providing an indication of roamer ports from which the called station will receive calls;

determining if a roamer port of the calling station can connect with the called station based on the listing of roamer ports; and denying call connection if the called station does not accept calls from the roamer port of the calling station.

2. The method of claim 1 further comprising the step of connecting the calling station to the called station if the called station accepts calls from roamer port of the calling station.

3. The method of claim 1 further comprising the step of notifying the calling station of denial of call connection.

4. The method of claim 1 wherein the step of accessing further comprises the step of accessing the listing of roamer ports at an HLR of the called station.

5. The method of claim 4 further comprising the step of transmitting a location indication of the called station to the MSC of the calling station if the called station accepts roamer port calls from the calling station.

6. The method of claim 1 wherein the step of accessing further comprises the steps of:

transmitting the listing of roamer ports associated with the called station to the MSC of the calling station; and accessing the transmitted list of roamer ports at the MSC of the calling station.

7. The method of claim 6 further including the step of transmitting an MSC of the called station from the HLR of the called station to the MSC of the calling station.

8. The method of claim 1 further including the steps of:
   determining if a call from the calling station to the called station comprises a long distance call; and
   connecting the calling station to the called station if the call does not comprise a long distance call.

9. The method of claim 1 wherein the list of roamer ports comprises a list of roamer ports from which the called station will accept calls.

10. The method of claim 1 wherein the list of roamer ports comprise a list of roamer ports from which the called station will not accept calls.

11. The method of claim 1 further including the step of generating the listing of roamer ports indicating from which roamer ports a called station will receive calls.

12. A method for connecting a call between a calling station and a called station, comprising the steps of:
   receiving at a MSC of the calling station a call connection request to the called station;
   accessing a listing of roamer ports associated with the called station at the HLR of the called station, the listing providing an indication of roamer ports from which the called station will receive calls;
   determining if the called station accepts calls from the roamer port of the calling station based on the listing of roamer ports;
   determining if the call from the calling station to the called station comprises a long distance call if the called station does not accept calls from the roamer port of the calling station; and
   denying call connection if the call comprises a long distance call.

13. The method of claim 12 further comprising the step of connecting the call if the call does not comprise a long distance call.

14. The method of claim 12 further comprising the step of connecting the calling station to the called station if the called station accepts calls from the roamer port of the calling station.

15. The method of claim 12 further comprising the step of notifying the MSC of the calling station of the denial of call connection.

16. The method of claim 12 wherein the list of roamer ports comprises a list of roamer ports from which the called station will accept calls.

17. The method of claim 12 wherein the list of roamer ports comprise a list of roamer ports from which the called station will not accept calls.

18. A method for connecting a call between a calling station and a called station, comprising the steps of:
   receiving at a MSC of the calling station a call connection request to a called station;
   contacting an HLR of the called station to request call connection;
   transmitting a listing of roamer ports associated with the called station to the MSC of the calling station from the HLR of the called station, the listing of roamer ports providing an indication of roamer ports from which the called station will accept calls;
   accessing the transmitted list of roamer ports at the MSC of the calling station;
   determining if the called station accepts calls from a roamer port of the calling station based on the listing of roamer ports;
   determining if the call from the calling station to the called station comprises a long distance call if the called station does not accept calls from the roamer port of the calling station; and
   denying call connection if the call comprises a long distance call.

19. The method of claim 18 further comprising the step of connecting the calling station to the called station if the called station accepts calls from the roamer port of the calling station.

20. The method of claim 18 further comprising the step of notifying the calling station of the denial of call connection.

21. The method of claim 18 further comprising the step of connecting the call if the call does not comprise a long distance call.

22. The method of claim 18 further including the step of transmitting an MSC of the called station from the HLR of the called station to the MSC of the calling station.

* * * * *

UNITED STATES PATENT AND TRADEMARK OFFICE
CERTIFICATE OF CORRECTION

PATENT NO : 6,044,269
DATED : March 28, 2000
INVENTOR(S): Gautam G. Talagery

It is certified that error appears in the above-identified patent and that said Letters Patent are hereby corrected as shown below:

Column 3, line 11      Replace "lob"
With --10b--

Signed and Sealed this

Tenth Day of April, 2001

*Attest:*

NICHOLAS P. GODICI

*Attesting Officer*     *Acting Director of the United States Patent and Trademark Office*